United States Patent
Babar

(10) Patent No.: US 9,975,978 B2
(45) Date of Patent: May 22, 2018

(54) METHOD FOR POLYMERISING ETHYLENICALLY UNSATURATED MONOMERS

(71) Applicant: WACKER CHEMIE AG, München (DE)

(72) Inventor: Muhammad Babar, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days. days.

(21) Appl. No.: 15/542,954

(22) PCT Filed: Feb. 11, 2016

(86) PCT No.: PCT/EP2016/052889
§ 371 (c)(1),
(2) Date: Jul. 12, 2017

(87) PCT Pub. No.: WO2016/128502
PCT Pub. Date: Aug. 18, 2016

(65) Prior Publication Data
US 2018/0002467 A1   Jan. 4, 2018

(30) Foreign Application Priority Data

Feb. 12, 2015 (DE) .................... 10 2015 202 580

(51) Int. Cl.
*C08F 2/00* (2006.01)
*C08F 20/06* (2006.01)
*C08F 118/02* (2006.01)
*C08F 218/08* (2006.01)
*B01J 19/02* (2006.01)

(52) U.S. Cl.
CPC ............. *C08F 218/08* (2013.01); *B01J 19/02* (2013.01); *B01J 2219/0204* (2013.01)

(58) Field of Classification Search
CPC ... C08F 218/08; B01J 19/02; B01J 2219/0204
USPC ........................................ 526/62, 317.1, 319
See application file for complete search history.

(56) References Cited

U.S. PATENT DOCUMENTS

| 5,147,455 | A | 9/1992 | Wanatabe et al. |
| 2005/0118333 | A1* | 6/2005 | Carlin ..................... C08F 2/004 427/230 |

FOREIGN PATENT DOCUMENTS

| EP | 0052421 A1 | 5/1982 |
| EP | 0062230 A2 | 10/1982 |
| WO | 9635723 A1 | 11/1996 |
| WO | 9635724 A1 | 11/1996 |
| WO | 9708210 A1 | 3/1997 |
| WO | 9824820 A1 | 6/1998 |
| WO | 03085003 A1 | 10/2003 |
| WO | 2013053895 A1 | 4/2013 |

OTHER PUBLICATIONS

International Search Report for International Application No. PCT/EP2016/052889, dated Apr. 25, 2016—2 Pages.

* cited by examiner

*Primary Examiner* — William K Cheung
(74) *Attorney, Agent, or Firm* — RatnerPrestia

(57) ABSTRACT

The invention relates to a method for polymerizing ethylenically unsaturated monomers by free-radical initiated emulsion polymerization in an aqueous medium in a polymerization reactor, wherein the inside walls and optionally also the fittings in the reactor are coated by applying a deposit-inhibiting product before the reactor is filled, characterized in that the surfaces that are to be coated with deposit-inhibiting product are treated with an acid solution.

9 Claims, No Drawings

METHOD FOR POLYMERISING ETHYLENICALLY UNSATURATED MONOMERS

CROSS-REFERENCE TO RELATED APPLICATIONS

This application is the U.S. National stage filing of International Application No. PCT/EP2016/052889, filed 11 Feb. 2016, and claims priority of German application number 10 2015 202 580.2, filed 12 Feb. 2015, the entireties of which applications are incorporated herein by reference.

FIELD OF THE INVENTION

The invention relates to a method for polymerizing ethylenically unsaturated monomers by radically initiated emulsion polymerization in aqueous medium in a polymerization reactor, in which the internal walls, and optionally the internals, of said reactor are coated, before the reactor is filled, by application of a scale inhibitor.

BACKGROUND OF THE INVENTION

In the production of vinyl acetate homopolymers and copolymers by radically initiated emulsion polymerization in water, polymer formed in the process is deposited as scale on the inner walls and on the internals of the polymerization reactor. These deposits hinder the polymerization, since the scale reduces heat exchange via the reactor wall, and the cooling of the reactor becomes more difficult. Additionally, small pieces of the wall scale may become detached and contaminate the polymerization product. In order to eliminate these disadvantages, the polymerization reactor would have to be cleaned to remove the deposits after each production cycle. That, however, would result in a significant extension to the polymerization times and would therefore worsen the economics of the polymerization process.

Disclosed in the prior art is the coating of the inner walls of the polymerization reactor, and also the internals in the polymerization reactor, such as stirrers or cooling facilities or metering devices, with a scale inhibitor (antifouling agent).

In EP 0 052 421 A1, for the purpose of preventing deposits during the polymerization of vinyl chloride, the recommendation is given to use scale inhibitors comprising condensation products of 1-naphthol and formaldehyde in alkaline, aqueous solution or in organic solution. To improve the adhesion of this inhibitor to the reactor wall, the addition of protective colloids, such as of partially hydrolyzed polyvinyl alcohol, for example, is recommended for dissolving the scale inhibitor. A disadvantage of these condensation products is their dark coloration.

To lighten the coloration, WO 97/08210 A1 recommends condensation products of hydroxy-substituted naphthalene compounds and hydroxymethanesulfinic or hydroxymethanesulfonic salts as scale inhibitors. These inhibitors are sprayed with steam on to the reactor walls, the adhesion being said to improve in line with the temperature of the steam.

In order to avoid the dark coloration of the scale inhibitor, WO 96/35723 A1 recommends a condensation product which is obtained by condensing a mixture of a 1-naphthol and a sulfoxylate, preferably a sodium hydroxymethanesulfinate.

WO 96/35724 A1 describes how, in order to improve the adhesion of the scale inhibitor specified in WO 96/35723 A1, it is to be applied by spraying with a steam spray at maximum temperature.

The recommendation in WO 2013/053895 A1, for improving the adhesion of the condensation products used as scale inhibitors, is to spray them on to the reactor wall in a mixture with an acrylic ester polymer.

For the purpose of suppressing the formation of scale during polymerization processes involving vinyl chloride or vinyl acetate, WO 98/24820 A1 recommends condensation products of an aldehyde, a phenol compound, and a hydroxy-substituted aromatic carboxylic acid in the form of their aqueous solution. WO 03/085003 A1 recommends improving the adhesion of these condensation products to the inner wall of the polymerization reactor by setting the pH of the solution at a pH of less than 5. For this purpose, in practice, the aqueous solution of the condensation product is mixed in line with an aqueous acid solution in a pipe conduit leading to the polymerization reactor, and the mixture in the reactor is sprayed on to the walls. A disadvantage is that in this case there may be premature agglomeration in the pipe conduit.

SUMMARY OF THE INVENTION

The object of the invention was that of providing a method with which the scale inhibitor quickly precipitates on the wall and forms a film, and the running of the scale inhibitor from the reactor wall is limited, and with which the adhesion of the scale inhibitor on the reactor wall can be improved, without the aforementioned disadvantages arising.

A subject of the invention is a method for polymerizing ethylenically unsaturated monomers by radically initiated emulsion polymerization in aqueous medium in a polymerization reactor, where the internal walls, and optionally internals, of said reactor are coated, before the reactor is filled, by application of a scale inhibitor, characterized in that the surfaces to be coated with scale inhibitor are treated with an acid solution.

DETAILED DESCRIPTION OF THE INVENTION

Suitable scale inhibitors are those which precipitate on the treatment with an acid solution, examples being the condensation products discussed above as prior art. Examples are the condensation products of formaldehyde with naphthol compounds such as 1-naphthol or 1,3-dihydroxynaphthalene or 1,5-dihydroxynaphthalene or 1,7-dihydroxynaphthalene (EP 0 052 421 A1), or the condensation products of a naphthol compound such as 1-naphthol and a sulfoxylate such as sodium hydroxymethanesulfinate (WO 97/08210 A1), or the condensation products of a naphthol compound such as 1-naphthol and a sulfoxylate obtained by reaction between aldehyde and hydrosulfite (WO 96/035723 A1), or the condensation products of a naphthol compound such as 1-naphthol and an aldehyde such as formaldehyde and an aromatic carboxylic acid which is hydroxylated on the aromatic nucleus, such as hydroxybenzoic acid (WO 98/24820 A1). Such condensation products are also available commercially, as for example under the brand name Noxol® from AkzoNobel or under the brand name Evicas® from INEOS.

The scale inhibitors are applied in the form of their aqueous solution. In general the aqueous solution contains 0.1 to 20 wt %, preferably 1 to 10 wt %, of scale inhibitor. The aqueous solution of the scale inhibitor is preferably sprayed together with steam.

In general the aqueous solution of the scale inhibitor is applied in an amount such that the treated surfaces in the reactor are coated with an amount of 0.1 to 10.0 g/m² of the scale inhibitor. For this purpose, the aqueous solution of the scale inhibitor may be applied in one step or in a plurality of steps; preferably, the aqueous solution of the scale inhibitor is applied one to three times.

With the method of the invention, the procedure is that, before the reactor is filled with the constituents of the polymerization mixture, and before or after the scale inhibitor is applied, the walls of the polymerization reactor, and optionally the internals of the polymerization reactor, such as stirrers, cooling facilities or feedlines, for example, are treated with an aqueous solution of an inorganic or organic acid.

Suitable acids are inorganic or organic acids having a pKa of pKa≤5. Examples are inorganic acids such as hydrochloric acid, sulfuric acid or nitric acid, or organic acids such as formic acid, acetic acid, ascorbic acid, citric acid, tartaric acid or oxalic acid. Ascorbic acid or citric acid are preferred. The concentration of the aqueous acid solution depends on the pKa of the respective acid. In general the concentration of the aqueous solution of the acid is 0.1 to 20 wt %. In the case of ascorbic acid or citric acid, the concentration of the aqueous solution is preferably 5 to 10 wt %.

For application of the acid solution to the surfaces to be treated with it, the acid solution is sprayed using steam. The acid solution is sprayed in an amount such that the areas to be treated with the scale inhibitor are wetted as completely as possible with the aqueous solution. In general the amount of acid solution for spraying is from 1 to 100.0 g/m².

Before the treatment with the aqueous acid solution or the application of the scale inhibitor, the reactor walls are preferably heated to a temperature of 40° C. to 100° C., more preferably 50° C. to 70° C.

The procedure here may be that first the acid solution is applied to the areas to be coated, and then the scale inhibitor. The inverse procedure is also possible, and first the scale inhibitor is applied, and then the acid solution. In one preferred embodiment, the procedure is such that first the aqueous acid solution is sprayed on, and then the scale inhibitor is sprayed on to the area to be treated. Following the application of the scale inhibitor, the coating formed may be left to solidify for up to 30 minutes.

In the stated embodiments, the application of the aqueous acid solution and/or of the scale inhibitor may be repeated in each case. The sequence is preferably carried out one to three times.

The reactor is subsequently charged with the reactants for the polymerization.

The method is suitable for preventing scaling in the polymerization of one or more ethylenically unsaturated monomers selected from the group containing vinyl esters of carboxylic acids having 1 to 15 carbon atoms, methacrylic esters or acrylic esters of carboxylic acids with unbranched or branched alcohols having 1 to 15 carbon atoms, olefins or dienes, vinylaromatics or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 5 to 13 carbon atoms, as for example VeoVa9® or VeoVa10® (trade names of Momentive). Particularly preferred is vinyl acetate.

Preferred methacrylic esters or acrylic esters are esters of unbranched or branched alcohols having 1 to 15 carbon atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particularly preferred are methyl acrylate, methyl methacrylate, n-butyl acrylate, and 2-ethylhexyl acrylate.

Preferred olefins or dienes are ethylene, propylene, and 1,3-butadiene. Preferred vinylaromatics are styrene and vinyltoluene. A preferred vinyl halide is vinyl chloride.

Optionally it is possible also for 0.05 to 50 wt %, preferably 0.1 to 10 wt % of auxiliary monomers to be copolymerized, based on the total weight of the monomers. Examples of auxiliary monomers are ethylenically unsaturated monocarboxylic and dicarboxylic acids, ethylenically unsaturated carboxamides, ethylenically unsaturated sulfonic acids and their salts, precrosslinking comonomers such as polyethylenically unsaturated comonomers, postcrosslinking comonomers such as N-methylolacrylamide, epoxide-functional comonomers, silicon-functional comonomers.

The method is suitable preferably for the polymerization of vinyl acetate and optionally further comonomers copolymerizable with vinyl acetate. Examples of monomers which can preferably be used are vinyl acetate, mixtures of vinyl acetate with ethylene, mixtures of vinyl acetate with ethylene and one or more other vinyl esters, mixtures of vinyl acetate with one or more other vinyl esters, mixtures of vinyl acetate with ethylene and (meth)acrylic ester, mixtures of vinyl acetate with ethylene and vinyl chloride, mixtures of vinyl chloride and ethylene and optionally one or more other vinyl esters.

Particularly preferred is vinyl acetate.

Also particularly preferred are mixtures containing vinyl acetate and 1 to 40 wt % of ethylene, based on the total weight of the monomers.

Also particularly preferred are mixtures containing vinyl acetate and 1 to 50 wt % of one or more further comonomers from the group of the vinyl esters having 1 to 12 carbon atoms in the carboxyl radical such as vinyl propionate, vinyl laurate, vinyl esters of alpha-branched carboxylic acids having 5 to 13 carbon atoms such as VeoVa9®, VeoVa10®, VeoVa11®, and optionally 1 to 40 wt % of ethylene, where the figures in wt % are based in each case on the total weight of the monomers and add up in each case to 100 wt %.

Also particularly preferred are mixtures containing vinyl acetate and 1 to 60 wt % of (meth)acrylic esters of unbranched or branched alcohols having 1 to 15 carbon atoms, especially methyl methacrylate, methyl acrylate, n-butyl acrylate or 2-ethylhexyl acrylate, which may optionally also contain 1 to 30 wt % of vinyl laurate or vinyl esters of an alpha-branched carboxylic acid having 5 to 13 carbon atoms, and also, optionally, 1 to 40 wt % of ethylene as well, where the figures in wt % are based in each case on the total weight of the monomers and add up in each case to 100 wt %.

Also particularly preferred are mixtures containing 1 to 60 wt % of vinyl chloride, 1 to 40 wt % of ethylene, and optionally one or more vinyl esters having 1 to 12 carbon atoms in the carboxyl radical such as vinyl acetate, vinyl propionate, vinyl laurate, vinyl esters of alpha-branched carboxylic acids having 5 to 13 carbon atoms such as VeoVa9®, VeoVa10®, VeoVa11®, where the figures in wt % are based in each case on the total weight of the monomers and add up in each case to 100 wt %.

The monomers and mixtures of monomers which are stated as being particularly preferred may in each case also contain the stated auxiliary monomers in the stated quantities, with the figures in wt % adding up to 100 wt % in each case.

In the case of preparation by the emulsion polymerization process, the polymerization temperature is preferably between 40° C. and 120° C., more preferably between 60° C. and 90° C. In the case of the copolymerization of gaseous comonomers such as ethylene, 1,3-butadiene or vinyl chloride, it is also possible to operate under pressure, generally between 5 bar and 100 bar.

The polymerization is preferably initiated with the water-soluble initiators or redox initiator combinations that are customary for emulsion polymerization. Examples of suitable oxidation initiators are the sodium, potassium, and ammonium salts of peroxodisulfuric acid, and hydrogen peroxide. The stated initiators are used generally in an amount of 0.01 to 2.0 wt %, based on the total weight of the monomers. Suitable reducing agents are, for example, sodium hydroxymethanesulfinate, tartaric acid, and (iso) ascorbic acid. The amount of reducing agent is preferably 0.015 to 3 wt %, based on the total weight of the monomers. The stated oxidizing agents may also be used on their own as thermal initiators.

The polymerization takes place in the presence of protective colloids and/or emulsifiers. Preferred protective colloids for the polymerization are polyvinyl alcohols, polysaccharides in water-soluble form such as starches or celluloses and derivatives thereof. Particularly preferred for use are partially hydrolyzed or fully hydrolyzed polyvinyl alcohols having a degree of hydrolysis of 80 to 100 mol %, especially partially hydrolyzed polyvinyl alcohols having a degree of hydrolysis of 80 to 95 mol % and a Höppler viscosity, in 4% strength aqueous solution, of 1 to 30 mPas (method according to Höppler at 20° C., DIN 53015).

Suitable emulsifiers are anionic, cationic, and nonionic emulsifiers, examples being anionic surfactants, such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, full esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

In general the protective colloid and/or the emulsifier are used in an amount of 1 to 5 wt %, based on the total weight of the monomers.

The polymerization may be operated batchwise as a batch operation or semibatch operation, or continuously. The monomers may in their entirety be introduced as an initial charge or metered in. Preferably 0 to 100 wt %, more preferably 2 to 50 wt %, of the monomers are included in the initial charge, based on the total weight of the monomers, and the remaining quantity of monomers is metered in at a later point in time during the emulsion polymerization. The metered feeds may be carried out separately (spatially and temporally), or the components for metering may all or partially be metered in pre-emulsified form. The protective colloids and/or emulsifiers may be wholly or partly metered in, wholly or partly included in the initial charge. The duration of the emulsion polymerization is measured starting with the initiation of the emulsion polymerization up to the point in time at which the conversion of the total ethylenically unsaturated monomers used amounts to preferably 85 wt % to 95 wt %.

After the end of the polymerization, residual monomers can be removed by employing known methods of postpolymerization—generally, by postpolymerization initiated with redox catalyst. Volatile residual monomers may also be removed by distillation, preferably under reduced pressure, and optionally with inert entraining gases such as air, nitrogen or steam being passed through or over the polymerization mixture.

The aqueous polymer dispersions obtainable accordingly have a solids content of 30 to 75 wt %, preferably of 50 to 60 wt %.

From the aqueous polymer dispersions it is possible to obtain polymer powders redispersible in water. To produce the polymer powders redispersible in water, the aqueous dispersions, optionally after addition of protective colloids as spraying aid, are dried, by means of fluidized bed drying, freeze drying or spray drying, for example.

The aqueous polymer dispersions and/or the water-redispersible dispersion powders obtainable from them may be used in the application fields typical for such systems: for example, in chemical construction products, optionally in conjunction with hydraulically setting binders such as cements (Portland, aluminate, trass, slag, magnesia, and phosphate cements), gypsum, and waterglass, for the production of construction adhesives, more particularly tile adhesives and composite thermal insulation adhesives, renders, troweling compounds, flooring compounds, leveling compounds, grouts, jointing mortars, and paints, and for modification of concrete. Additionally, as binders for coating materials and bonding agents, or as coating materials and/or binders for textiles and paper.

With the method of the invention it is possible effectively to reduce the formation of deposits in the interior of the polymerization reactor during both batchwise and continuous operation. Deposits on the inner reactor walls are manifested in particular in a restriction on heat transport via the reactor jacket. A consequence of this is that in order to cool the exothermic polymerization, with increasing formation of scale, it is necessary to lower the cooling water temperature (jacket temperature) Tm. It has been found that with the method of the invention it is possible to prolong significantly the extent of campaigns in the case of continuous operation of the reactor.

EXAMPLE

The method was tested in a continuously operated 500 l reactor for producing an aqueous vinyl acetate-ethylene copolymer dispersion stabilized with polyvinyl alcohol.

The clean, empty reactor was heated with the reactor jacket to 70° C. The inner reactor walls and internals were sprayed using steam with 60 g of a 10% strength aqueous ascorbic acid solution. The inner reactor walls and internals thus pretreated were subsequently sprayed using steam with 90 g of an aqueous Noxol solution (Noxol ETH/S3 from AkzoNobel). The reactor was then flushed with nitrogen and held at 70° C. for 30 minutes. This sequence was repeated once more. Thereafter the reaction was charged continuously with the reactants for the polymerization, and the product of the polymerization was taken off continuously.

After a campaign duration of 40 days, the cooling water temperature Tm necessary for cooling the polymerization had dropped from 23° C. to 6° C.

For comparison, a campaign was carried out wherein an analogous procedure was adopted, with the sole difference that the inner reactor walls and internals had been sprayed using steam only with 90 g of an aqueous Noxol solution (Noxol ETH/S3 from AkzoNobel), but no spraying with aqueous ascorbic acid solution had been performed.

After a campaign duration of only 19 days, the cooling water temperature Tm needed to cool the polymerization had already dropped to 6° C.

This showed that the scaling is reduced significantly with the acidification of the invention. In comparison to the procedure where only the aqueous solution of the scale inhibitor was applied, the cost and effort of cleaning could be reduced significantly by the additional acidification of the inner reactor walls.

With the method of the invention, therefore, the cleaning intervals become longer and, in the case of continuous polymerization, the extent of campaigns is prolonged as well. With polymerization carried out continuously, the daily drop in the jacket temperature Tm (cooling water temperature) is reduced, and the extent of campaigns is increased accordingly, without a drop in the daily tonnage output.

The invention claimed is:

1. A method for polymerizing ethylenically unsaturated monomers, comprising radically initiated emulsion polymerization of the ethylenically unsaturated monomers in aqueous medium in a polymerization reactor, wherein the internal walls, and optionally internals, of said reactor are coated before the reactor is filled by application of a scale inhibitor which precipitates on the treatment with an acid solution, wherein the surfaces to be coated with the scale inhibitor are treated with an acid solution, wherein first the acid solution is applied to the areas that are to be coated, and subsequently the scale inhibitor, or wherein first the scale inhibitor is applied and subsequently the acid solution.

2. The method as claimed in claim 1, wherein the scale inhibitor is selected from the group consisting of condensation products of formaldehyde with naphthol compounds, condensation products of a naphthol compound and a sulfoxylate, and condensation products of a naphthol compound and an aldehyde and an aromatic carboxylic acid which is hydroxylated on the aromatic nucleus.

3. The method as claimed in claim 1, wherein before the reactor is filled with the constituents of the polymerization mixture and before and/or after the scale inhibitor is applied, the walls of the polymerization reactor and optionally the internals of the polymerization reactor are treated with an aqueous solution of an inorganic or organic acid.

4. The method as claimed in claim 1, wherein the acid in the acid solution is an inorganic or organic acid having a pKa of $pKa \leq 5$.

5. The method as claimed in claim 1, wherein the aqueous solution of the scale inhibitor is applied in one step or in a plurality of steps.

6. The method as claimed in claim 1, wherein the application of the scale inhibitor and/or of the aqueous acid solution is repeated in each case.

7. The method as claimed in claim 1, wherein the polymerization is operated batchwise.

8. The method as claimed in claim 1, wherein the polymerization is operated continuously.

9. The method as claimed in claim 1, wherein vinyl acetate and optionally further comonomers copolymerizable with vinyl acetate are polymerized.

* * * * *